(12) United States Patent
Miller et al.

(10) Patent No.: US 7,120,786 B2
(45) Date of Patent: Oct. 10, 2006

(54) BOOTING FROM A COMPRESSED IMAGE

(75) Inventors: Wesley G. Miller, Sammamish, WA (US); Richard Allen Pletcher, Redmond, WA (US); Bruce L. Green, Sammamish, WA (US); Jason Cohen, Seatac, WA (US)

(73) Assignee: Microsoft Corporation, Redmond, WA (US)

( * ) Notice: Subject to any disclaimer, the term of this patent is extended or adjusted under 35 U.S.C. 154(b) by 531 days.

(21) Appl. No.: 10/608,350

(22) Filed: Jun. 27, 2003

(65) Prior Publication Data

US 2004/0006689 A1    Jan. 8, 2004

Related U.S. Application Data

(63) Continuation-in-part of application No. 10/172,953, filed on Jun. 17, 2002, now Pat. No. 6,947,954, and a continuation-in-part of application No. 10/173,297, filed on Jun. 17, 2002, now Pat. No. 7,017,144.

(51) Int. Cl.
G06F 9/24 (2006.01)
G06F 9/445 (2006.01)
G06F 15/177 (2006.01)

(52) U.S. Cl. .................. 713/1; 713/2; 713/100
(58) Field of Classification Search .......... 713/1, 713/2
See application file for complete search history.

(56) References Cited

U.S. PATENT DOCUMENTS

| | | |
|---|---|---|
| 5,155,594 A | 10/1992 | Bernstein et al. |
| 5,267,330 A | 11/1993 | Masuda |
| 5,307,497 A * | 4/1994 | Feigenbaum et al. .......... 713/1 |
| 5,467,441 A | 11/1995 | Stone et al. |
| 5,519,869 A | 5/1996 | Payne et al. |
| 5,694,201 A | 12/1997 | Hayashi et al. |
| 5,940,871 A | 8/1999 | Goyal et al. |
| 6,098,158 A | 8/2000 | Lay et al. |
| 6,122,734 A * | 9/2000 | Jeon ............................. 713/2 |
| 6,167,562 A | 12/2000 | Kaneko |
| 6,279,109 B1 * | 8/2001 | Brundridge .................... 713/2 |
| 6,304,965 B1 * | 10/2001 | Rickey .......................... 713/2 |
| 6,357,000 B1 | 3/2002 | Jain |
| 6,374,353 B1 * | 4/2002 | Settsu et al. ................... 713/2 |
| 6,434,695 B1 * | 8/2002 | Esfahani et al. ............... 713/2 |
| 6,453,363 B1 | 9/2002 | Slivka et al. |
| 6,636,958 B1 * | 10/2003 | Abboud et al. ............. 711/173 |
| 6,658,563 B1 * | 12/2003 | Ice et al. ....................... 713/2 |
| 6,701,513 B1 | 3/2004 | Bailey |
| 6,718,548 B1 * | 4/2004 | Hsiao .......................... 717/174 |
| 6,721,002 B1 | 4/2004 | Dotsubo et al. |
| 6,751,357 B1 | 6/2004 | Boon |
| 6,763,150 B1 | 7/2004 | MacDonald |

(Continued)

OTHER PUBLICATIONS

Favelu et al., "Image-retrieval agent: integrating image content and text," Oct. 1999, IEEE Intelligent Systems, pp. 36-39.

(Continued)

Primary Examiner—Thomas Lee
Assistant Examiner—Ji H. Bae
(74) Attorney, Agent, or Firm—Senniger Powers (57) ABSTRACT

Accessing files within a compressed image to boot from the compressed image. In one embodiment, the compressed image includes a boot environment and a software image combined to reduce file redundancy. The invention boots into the boot environment within the compressed image to install the software image on a computer.

24 Claims, 4 Drawing Sheets

U.S. PATENT DOCUMENTS

| | | | |
|---|---|---|---|
| 6,763,515 | B1 | 7/2004 | Vazquez et al. |
| 6,782,402 | B1 | 8/2004 | Hidaka et al. |
| 6,868,539 | B1 | 3/2005 | Travison et al. |
| 6,877,154 | B1 | 4/2005 | Nagashima et al. |
| 6,938,211 | B1 | 8/2005 | Chang et al. |
| 6,944,865 | B1 | 9/2005 | Zurawski |
| 6,947,659 | B1 | 9/2005 | Nishi et al. |
| 6,976,058 | B1 * | 12/2005 | Brown et al. ............... 709/217 |
| 2002/0129233 | A1 | 9/2002 | Hillis et al. |
| 2002/0161932 | A1 | 10/2002 | Herger et al. |
| 2004/0218902 | A1 | 11/2004 | Yanagita |

OTHER PUBLICATIONS

Render et al., "An Object-Oriented Model of Software Configuration Management," ACM, 1991, pp. 127-139.

Khalidi et al., "Extensible File Systems in Spring," Proceedings of the Fourteenth ACM Symposium on Operating Systems Principles, 1993, pp. 1-14, ACM press, New York, U.S.A.

Heidemann et al., "File-System Development with Stackable Layers," ACM Transactions on Computer Systems (TOCS), Feb. 1994, pp. 58-89, vol. 12, Issue 1, ACM Press, New York, U.S.A.

Rubini, "Kernel Korner: Booting the Kernel," Linux Journal, Jun. 1997, 7 pages, vol. 1997, Issue 38es, Specialized Systems Consultants, Inc., Seattle, WA, U.S.A.

Helander et al., "MMLite: A Highly Componentized System Architecture," Proceedings of the 8th ACM SIGOPS European Workshop on Support for Composing Distributed Applications, 1998, pp. 96-103, ACM Press, New York, U.S.A.

Solomon et al., Inside Microsoft Windows 2000 Third Edition, Microsoft Press, 2000, pp. 46-87, 177-206, and 215-236.

* cited by examiner

BOOTING FROM A COMPRESSED IMAGE

CROSS-REFERENCE TO RELATED APPLICATIONS

This application is a continuation-in-part of U.S. patent application Ser. No. 10/172,953, filed Jun. 17, 2002 now U.S. Pat. No. 6,947,954, entitled IMAGE SERVER STORE SYSTEM AND METHOD USING COMBINED IMAGE VIEWS, and U.S. patent application Ser. No. 10/173,297 filed Jun. 17, 2002 now U.S. Pat. No. 7,017,144, entitled COMBINED IMAGE VIEWS AND METHODS OF CREATING IMAGES, which are hereby incorporated herein by reference in their entirety for all purposes.

TECHNICAL FIELD

Embodiments of the present invention relate to the field of operating systems. In particular, embodiments of this invention relate to accessing an operating system boot environment within a compressed software image.

BACKGROUND OF THE INVENTION

A computer typically relies on several steps to boot. Those skilled in the art are familiar with the typical boot process for a computer such as a personal computer. The basic input output system (BIOS) or other firmware boot code initializes the system which then initializes any devices (e.g., network, hard disk, or compact disc) from which to boot. At this point, the system initializes local boot code and launches a boot environment. The boot environment provides operating systems services or other resources to applications. The boot environment enables additional operations to be performed such as installing a software image of an application program (e.g., a word processing application program or a spreadsheet application program). However, the boot environment is often too large to be stored along with the software image on most computer-readable media. For example, with a software image size of 600 megabytes (MB) and a boot environment size of 150 MB, the 750 MB total exceeds the 680 MB maximum for optical media per ISO 9660.

Some existing systems provide a layered file system in which one layer compresses all data before writing it out to a medium and uncompresses all data read from the medium to save space on the medium. Such a file system may be implemented as a layer on top of a base file system existing on the medium. For example, such a system may mount a compressed tape archive (e.g., tar) file. However, such a system fails to provide a compressed, bootable software image.

Further, some existing systems allow a computer to boot from a compressed kernel. However, the kernel does not provide a rich boot environment such as provided by a minimal operating system. Other prior systems save a compressed image of an operating system in an extended memory area of a computer's physical memory and then boot (e.g., "soft boot") the computer from that static image. Still other prior systems compress portions of an operating system in a read-only memory image and execute the system from the compressed image. Yet other prior systems boot a system by first executing uncompressed BIOS code to enable memory and then uncompressing BIOS code as needed to complete the boot. However, these systems lack the ability for a computer to be able to boot from an image of a boot volume that is compressed, to reduce random access memory overhead on the computer, and to boot on any standard personal computer using standard boot firmware. Further, the existing systems lack the flexibility of having the compressed image exist as a file.

Accordingly, a system for accessing a bootable software image stored within a compressed file on a computer-readable medium is desired to address one or more of these and other disadvantages.

SUMMARY OF THE INVENTION

Embodiments of the invention include a driver component providing access to a boot environment and a software image stored in a compressed image. In one embodiment, the invention includes a bootable compressed image comprising the boot environment and the software image which have been combined to reduce storage size on a computer-readable medium. Boot code loads the driver component of the invention which is capable of reading the compressed image. By reading the compressed image and intercepting calls from the boot code and the operating environment within, the driver effectively emulates a software file system and allows the operating environment to boot. Booting a computer from a compressed image provides a boot environment that is compressed, compact, and portable (e.g., residing in one storage binary).

Building a binary image store or other compressed file or image that has the capability of being booted allows the operating environment to be compacted, transported, and booted from within a single cohesive binary. This allows for portability and speed of use. When combined with an image-based setup and single instance storage in one embodiment, the invention conveniently boots the operating environment and applies an operating system while conserving memory (e.g., saving several hundred megabytes of memory). The invention yields an image-based operating system that has the capability of booting itself. The invention provides a compressed image as a file to enable booting from an image of a boot volume that is compressed and to reduce random access memory overhead on the computer. The invention provides significant benefits to various applications including the embedded computer market where compact environments and easy replacement of the operating environment are essential.

In accordance with one aspect of the invention, a method accesses a compressed image including a boot environment and a software image stored on a computer-readable medium. The boot environment and software image include a plurality of files combined to reduce file redundancy. The method includes executing a driver component to identify the boot environment in the compressed image. The driver component further loads the compressed image as a file system. The driver component further boots from the identified boot environment via the file system.

In accordance with another aspect of the invention, a method accesses a compressed image stored on a computer-readable medium. The compressed image stores descriptive data and file data. The method includes executing a driver component to identify a boot environment in the compressed image via the descriptive data. The driver component also loads the compressed image as a file system to provide access to the file data. The driver component further boots from the identified boot environment via the file system.

In accordance with yet another aspect of the invention, one or more computer-readable media have one or more computer-executable components for accessing a compressed image. The compressed image includes a boot environment and a software image. The boot environment and software image include a plurality of files combined to reduce file redundancy. The computer-executable components include a driver component for identifying the boot environment in the compressed image. The driver component also loads the compressed image as a file system. The driver component also boots from the identified boot environment via the file system.

In accordance with still another aspect of the invention, a computer-readable medium stores a data structure representing a compressed image. The data structure includes a boot environment and a software image. The boot environment and the software image include a plurality of files combined to reduce file redundancy.

In accordance with another aspect of the invention, a system for booting from a compressed image includes a boot environment and a software image stored on a computer-readable medium. The boot environment and software image include a plurality of files combined to reduce file redundancy. The system includes means for identifying the boot environment in the compressed image. The system also includes means for loading the compressed image as a file system. The system also includes means for booting from the identified boot environment via the file system.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Embodiments of the invention access a compressed image (e.g., a binary store) stored on a computer-readable medium. The compressed image comprises a plurality of files. In one embodiment, a driver component or other computer-executable code (e.g., driver code) identifies, loads, and boots from a boot environment stored within the compressed image. The boot environment provides operating systems services or other resources to applications. The boot environment enables additional operations to be performed such as installing a software image of an operating system or application program on a computer (e.g., a word processing application program or a spreadsheet application program). In one embodiment, the compressed image stores the software image and the boot environment in a combined format to reduce file redundancy. The invention provides the compressed image as an image-based operating system that has the capability of booting itself. The invention overlays a file system listing the files within the compressed image over an existing file system.

The invention software boots from various computer-readable storage media including, but not limited to, flash memory, compact disc, and digital versatile disk (DVD) media to install or run an operating system stored on the computer-readable storage media or elsewhere. For example, a pre-install environment or other minimal operating system may be stored on a flash disk and accessible (e.g., via a universal serial bus) to perform one or more of the following tasks: deploy an operating system to a new or damaged system, recover an operating system installation or user files from a damaged system, maintain and support a running system, scan for viruses and repair an infected system, perform disk defragmentation and error checking, and manipulate and format partition.

The invention differs from existing systems in many ways. For example, with the invention, data within the compressed image is utilized while the image as a whole is still compressed. That is, there is no need to uncompress the entire compressed image to utilize the data in the image. The invention uncompresses portions of individual files as needed rather than uncompressing the entire file. Existing systems uncompress files, store the uncompressed files in intermediate storage, and then boot from the uncompressed files. The present invention does not require such intermediate storage. While some existing file systems access compressed binaries without uncompressing the binaries for storage in local memory, these existing file systems lack a bootable, compressed image.

Exemplary Operating Environment

Figure 1:
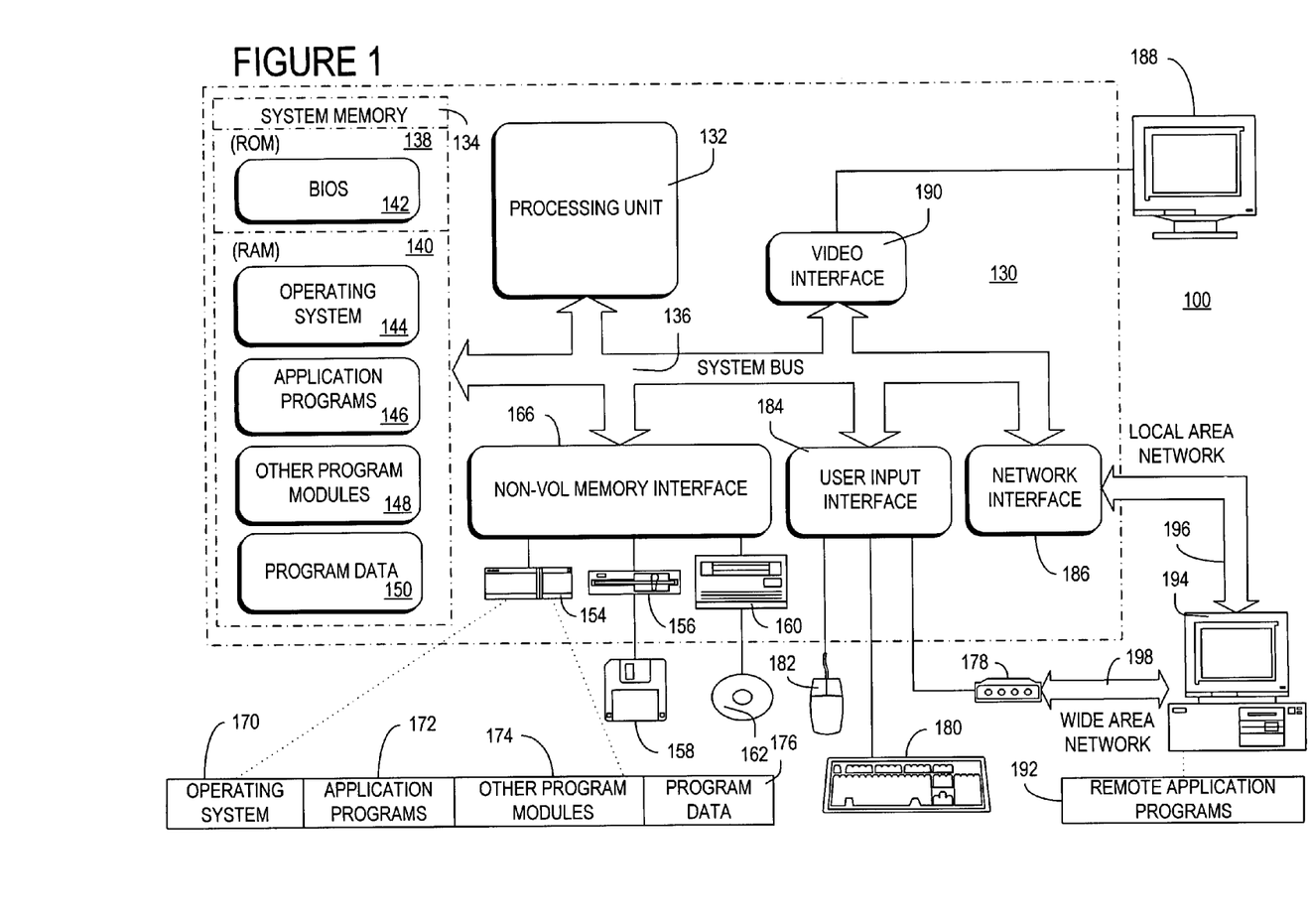
FIG. 1 is a block diagram illustrating one example of a suitable computing system environment in which the invention may be implemented.

FIG. 1 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system but 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 1 illustrates operating system 144, application programs 146, other program modules 148, and program data 150.

The computer 130 may also include other removable/non-removable, volatile/nonvolatile computer storage media. For example, FIG. 1 illustrates a hard disk drive 154 that reads from or writes to non-removable, nonvolatile magnetic media. FIG. 1 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 1, provide storage of computer readable instructions, data structures, program modules and other data for the computer 130. In FIG. 1, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 1 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 1 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

After powering on a computer such as computer 130, typical boot operations include the firmware (or hardware) initializing the system including the boot device (e.g., hard drive, network, optical media, etc.). The firmware passes control to the software. A boot sector or other boot specifier on the media device initializes software boot code. The boot code initializes and performs additional operations to complete the boot process.

For general information regarding the boot process and the operating system components available in the WINDOWS brand operating system, refer to Solomon and Russinovich, *Inside Microsoft Windows* 2000, 3$^{rd}$ Edition, 2000, pages 46–87, 177–206, and 215–236, herein incorporated by reference.

Compressed Image Format

Figure 2:
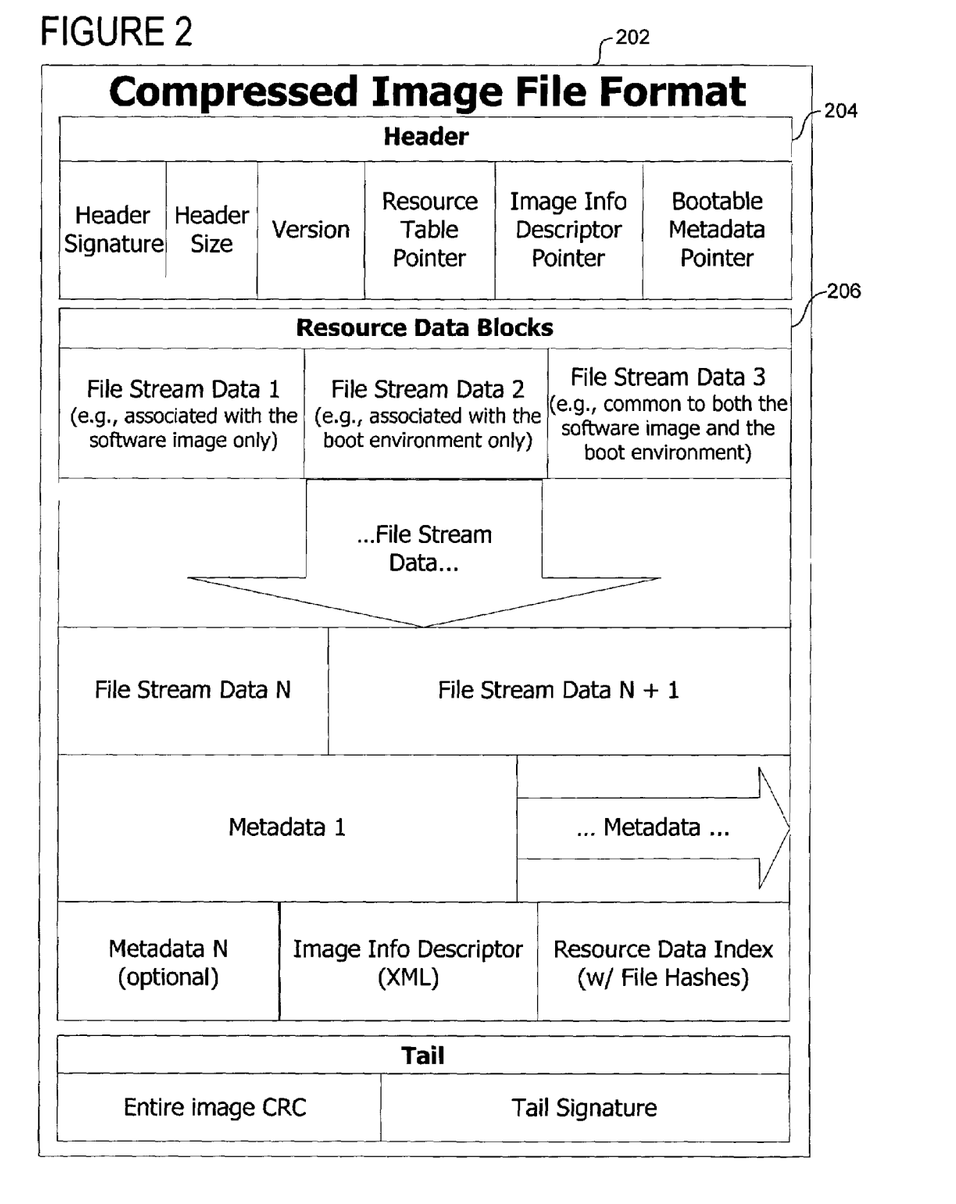
FIG. 2 is an exemplary block diagram illustrating a compressed image format.

Referring next to FIG. 2, a block diagram illustrates an exemplary compressed image format 202 for use with the invention. Generally, the exemplary compressed image format 202 includes descriptive data (e.g., a header 204) and file data (e.g.,) resource data blocks 206). Exemplary descriptive data includes metadata such as one or more of the following: a file name, an attribute, a file update time, a compression format, a file location and a stream. Exemplary file data comprises file stream data.

In one embodiment as described herein, the software image and the boot environment have been combined to reduce file redundancy. That is, data common to both the software image and the boot environment is stored only once in the compressed image. The resource data blocks 206 in FIG. 2 illustrate the resulting combined image. For example, file stream data 1 stores a data block associated with the software image while file stream data 2 stores a data block associated with the boot environment. File stream data 3 stores a data block that is common to both the software image and the boot environment. Those skilled in the art will appreciate that any of the resource data blocks may be associated with either or both of the software image and the boot environment.

While described with reference to FIG. 2, the invention is contemplated by the inventors to be operable with any form of compressed image format. An image of an operating system, application program, or other data represents a copy of the memory area storing the data. For example, an image may represent a copy of an installed operating system, application, or utility that may be distributed to other computers.

Those skilled in the art will note that the image structure 202 of FIG. 2 is merely exemplary. It is contemplated by the inventors that the invention is operable with any image format.

Booting from the Compressed Image

Figure 3:
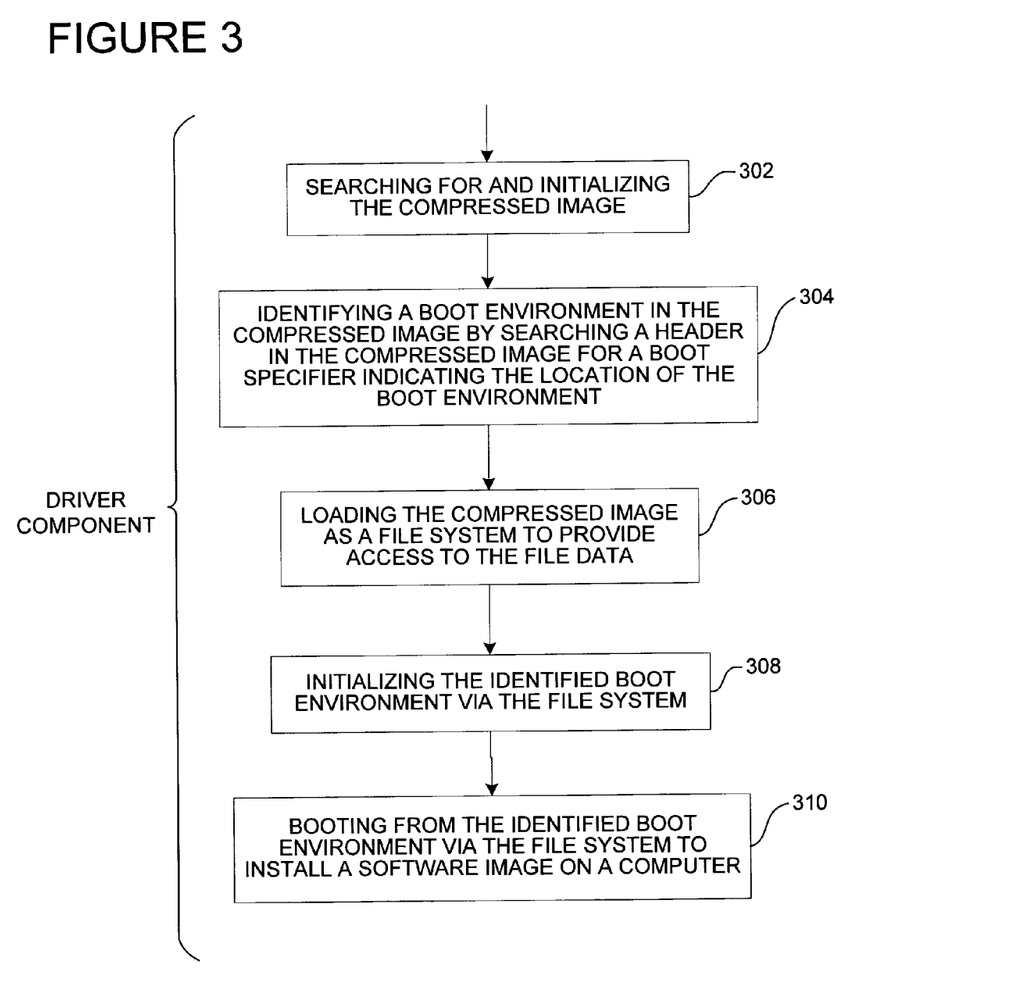
FIG. 3 is an exemplary flow chart illustrating operation of the driver component of the invention.

Referring next to FIG. 3, an exemplary flow chart illustrates operation of the driver component of the invention. In general, the invention software accesses the compressed image comprising the boot environment and the software image stored on a computer-readable medium. In one form, the boot environment and software image include a plurality of files combined to reduce file redundancy. The invention software includes a driver component that executes to perform the method illustrated in FIG. 3. In particular, the driver component seeks or otherwise searches for the compressed image and initializes or otherwise opens the compressed image on the computer-readable medium at 302. The driver component further identifies the boot environment in the compressed image by searching a header for a boot specifier indicating the location of the boot environment on the computer-readable medium at 304. The driver component also loads the compressed image as a file system at 306 and initializes the identified boot environment at 308. The driver component boots from the identified boot environment via the file system to install the software image on a computer at 310.

In one embodiment, the driver component executes in the context of a running operating system. Further, the driver component may be embodied in one or more of the following: software, firmware, and hardware. The software image comprises an operating system and/or an application program. The boot environment includes any form of operating system including, but not limited to, a minimal operating system or a full operating system. One or more computer-readable media have computer executable instructions for performing the method illustrated in FIG. 3.

In one embodiment, the boot process of the invention for a computer or other computing device includes the following operations. After powering on, hardware or firmware associated with the computer initializes the system. Firmware initializes the boot device (e.g., hard drive, network, or optical media) and passes control to software. A boot sector or other boot specifier on the medium initializes software boot code. The software boot code initializes and launches the driver component (e.g., fs_ext.sys). The driver component seeks the compressed image file (e.g., image.wim). If the compressed image is not found, the boot code proceeds to boot as in an existing system. That is, the invention software proceeds with a typical boot process if the invention fails to locate a compressed image file.

If the driver component locates the compressed image, the driver component initializes or otherwise opens the compressed image file. The driver component seeks through the compressed store to find a boot environment. In one embodiment, the driver component executes to search a header for a boot sector, specifier, pointer to metadata, or other metadata identifying the location of the boot environment (e.g., via a pointer). To access the files within the compressed image, the driver component loads the compressed image as a file system. That is, the driver component interprets the data in the compressed image as a list of the files available within the compressed image. In particular, the driver component interprets metadata associated with the compressed image as a list of files stored within the compressed image. The metadata identifies and locates the files within the compressed image. That is, the metadata associates individual files and file streams with resource data blocks within the compressed image. The driver component initializes the boot environment and boots from the initialized boot environment. The driver component uncompresses selected files in the boot environment and boots from the selected files executing in local memory without storing the selected files in memory. That is, the invention boots from the boot environment via the uncompressed files without storing the uncompressed files in memory.

By loading the compressed image as a file system, the driver component provides transparent access to the compressed image allowing the boot environment to boot normally as it would from standard physical media. While other methods of mounting a file system are known in the art, these methods fail to provide access to a compressed and bootable software image. By abstracting the compressed images as a file system, the driver component reduces the need for special code in the boot environment to access the compressed image.

In one example, a computer-readable medium according to the invention may appear to only store a boot time driver (e.g., ntldr), a boot loader (e.g., boot.ini), and a compressed image file (e.g., image.wim) prior to execution of the driver component. After the driver component has overlaid the compressed image as a file system (e.g., decoded and virtually overlaid the files within image.wim over the base file system of the media), a computer-readable medium according to the invention may appear to also store additional files that were encoded within the compressed image.

In one embodiment, a boot-time driver or other boot code loads the driver component (e.g., fs_ext.sys executing in the loader environment) to interpret the compressed image as a file system. Another driver component (e.g., a file system driver such as wimfs executing in protected mode) is subsequently loaded to interpret the compressed image as a file system during run-time. The driver components (e.g., fs_ext.sys and wimfs) receive file application program interface (API) calls from application programs and execute those calls on the compressed image as if the compressed image was organized according to a file system.

Alternatively or in addition, the compressed image includes descriptive data and file data. In one embodiment, the descriptive data includes metadata including one or more of the following: a file name, an attribute, a file update time, a compression format, a file location and a stream. The file data comprises binary file data.

Combining the Boot Environment and the Software Image

Figure 4:
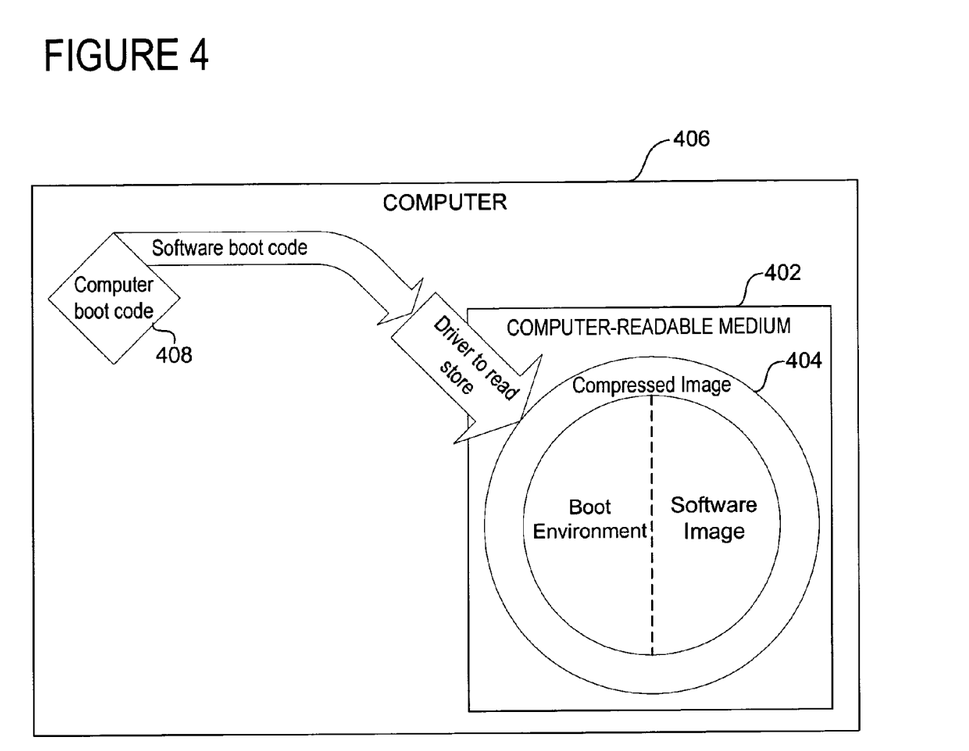
FIG. 4 is a block diagram illustrating an exemplary computer-readable medium on which the invention may be stored.

Referring next to FIG. 4, a block diagram illustrates an exemplary computer-readable medium 402 on which data structures of the invention may be stored. The computer-readable medium 402 stores a compressed data structure such as compressed image 404 including the boot environment and the software image. In FIG. 4, the boot environment and the software image have been combined to reduce file redundancy. The computer-readable medium 402 shown in FIG. 4 is associated with a computer 406 or other computing device. Computer boot code 408 in the computer 406 includes software boot code which loads the driver component of the invention. The driver component interprets the compressed image 404 to identify the files stored therein. Although illustrated in FIG. 4 in connection with the computer 406, the computer-readable medium 402 is contemplated by the inventors to be located anywhere accessible to the computer 406 (e.g., remotely from the computer 406) and to comprise both removable and non-removable media.

When creating the compressed image 404, an image representing, for example, an installation of an operating system is compressed to create the compressed image 404 for delivery to a customer. The compressed image 404 is added to medium 402 storing the bootable run-time environment (e.g., an operating system with minimal functionality) for delivery to the customer. However, there are many files in the compressed image 404 that are also present in the bootable run-time environment. As such, there are two copies on the medium 402 of those duplicate files. In one embodiment, the compressed image 404 is stored separately from the bootable run-time environment on the medium 402. In an alternative embodiment, the software image and the run-time environment are combined to form one image 404. Combining the images includes eliminating file duplicity between the software image and the run-time environment to reduce the storage size of the resulting, combined image 404 stored on the medium 402.

The invention is operable with any algorithm for combining images. For example, one such algorithm may create a single combined image from multiple individual images by (1) separating the descriptive data (e.g., metadata) describing the files within each individual image from the actual data of the files themselves, and (2) separating data within each individual image that is common across multiple images. Each of the descriptive data blocks of each individual image is included in the combined image whereas only a single copy of the common data is included in the combined image. Those skilled in the art will appreciate that there are other methods for combining application programs and/or operating systems to reduce file redundancy.

In one embodiment, the compressed image 404 is segmented into a plurality of segments each of which are compressed separately from the other segments. For example, each segment may store thirty-two kilobytes of data prior to compression. The size of each segment is configurable based on performance, compression results, or any other metric or statistic.

As described with reference to FIG. 2, the descriptive data identifies the segments. For example, the descriptive data may include an offset table with each entry in the table identifying a location of one or more of the segments. For example, the offset table may include pointers pointing to one or more of the segments. During execution, the invention software only uncompresses those segments storing desired data as opposed to uncompressing the entire image 404 to obtain the desired data. The compression scheme may include any compression algorithm such as an algorithm using Lempel Ziv compression or variants thereof. Alternatively or in addition, the boot environment and the software image may be compressed separately.

EXAMPLES

The followings examples further illustrate the invention. In operation, computer 130 executes computer-executable instructions such as those illustrated in FIG. 3 to access the compressed image to identify the boot environment stored in the compressed image, to load the compressed image as a file system, and to boot the identified boot environment via the file system to install the software image on a computer.

The invention includes a system for booting from the compressed image comprising the boot environment and the software image stored on the computer-readable medium.

The system includes the driver component and/or other computer-executable instructions that constitute means for identifying the boot environment in the compressed image, means for loading the compressed image as a file system, and means for booting from the identified boot environment loaded as a file system to install the software image on a computer. The system executes in the context of a running operating system. Structures corresponding to the means listed above further include the elements illustrated in the figures and described herein.

In one example, all the boot files may be archived or packaged into a single compressed image (e.g., such as by using a "zip" program, by using "tar" in UNIX operating system, or by using any other type of binary compression application). The driver component according to the invention interprets the compressed image as a file system to allow a boot driver or loader to issue commands to boot from the compressed image.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method for accessing a compressed image comprising a boot enviromnent and a software image stored on a computer-readable medium, said boot environment and software image comprising a plurality of files combined to reduce file redundancy, said method comprising executing a driver component to perform:
identifying the boot environment in the compressed image, wherein the compressed image comprises a plurality of files;
loading the compressed image as a file system; and
booting from the identified boot environment via the file system by uncompressing at least one of the files associated with the identified boot environment and booting from the identified boot environment via the uncompressed files without storing the uncompressed files in memory.

2. The method of claim 1, further comprising performing one or more of the following: installing a software image on a computer, system preparation, and system maintenance.

3. The method of claim 1, further comprising initializing the identified boot environment.

4. The method of claim 1, further comprising:
seeking the compressed image on the computer-readable medium; and
initializing the compressed image.

5. The method of claim 1, wherein executing comprises executing the driver component in the context of a running operating system.

6. The method of claim 1, further comprising searching for the compressed image and opening the compressed image.

7. The method of claim 1, wherein the driver component is embodied in one or mare of the following: software, firmware, and hardware.

8. The method of claim 1, wherein the compressed image includes a header and wherein identifying comprises searching the header for a boot specifier indicating the location of the boot environment on the computer-readable medium.

9. The method of claim 1, wherein the software image comprises an operating system.

10. The method of claim 1, wherein the boot environment comprises a minimal operating system.

11. One or more computer-readable storage media having computer executable instructions for performing the method of claim 1.

12. A method for accessing a compressed image stored on a computer-readable medium, said compressed image storing descriptive data and file data, said method comprising executing a driver component to perform:
identifying a boot environment in the compressed image via the descriptive data, wherein the compressed image comprises a plurality of files;
loading the compressed image as a file system to provide access to the file data; and
booting from the identified boot environment via the file system by uncompressing at least one of the files associated with the identified boot environment and booting from the identified boot environment via the uncompressed files without storing the uncompressed files in memory.

13. The method of claim 12, further comprising performing one or more of the following: installing a software image on a computer, system preparation, and system maintenance.

14. The method of claim 12, wherein the descriptive data comprises metadata including one or more of the following: a file name, an attribute, a file update time, a compression format, a file location and a stream.

15. The method of claim 12, wherein the file data comprises binary file data.

16. The method of claim 12, further comprising initializing the identified boot environment.

17. The method of claim 12, further comprising:
seeking the compressed image on the computer-readable medium; and
initializing the compressed image.

18. The method of claim 12, wherein executing comprises executing the driver component in the context of a running operating system.

19. The method of claim 12, further comprising searching for the compressed image and opening the compressed image.

20. The method of claim 12, wherein the driver component is embodied in one or more of the following: software, firmware, and hardware.

21. The method of claim 12, wherein the compressed image includes a header and wherein identifying comprises searching the header for a boot specifier indicating the location of the boot environment on the computer-readable medium.

22. The method of claim 12, wherein the software image comprises an operating system.

23. The method of claim 12, wherein the boot environment comprises a minimal operating system.

24. One or more computer-readable storage media having computer executable instructions for performing the method of claim 12.

* * * * *